Jan. 1, 1929.
O. M. PETERS
1,697,821
NONSKID CHAIN
Filed Oct. 22, 1925
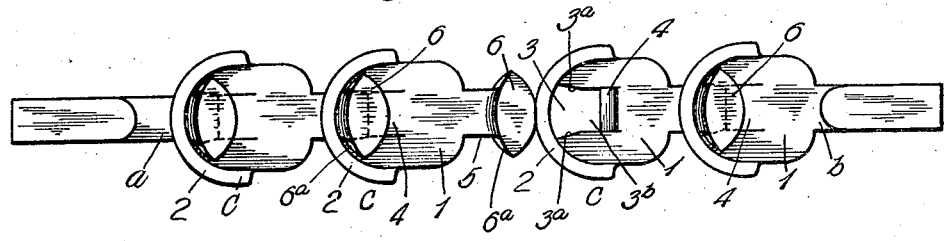
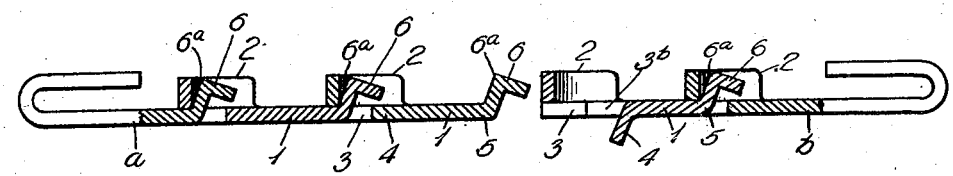
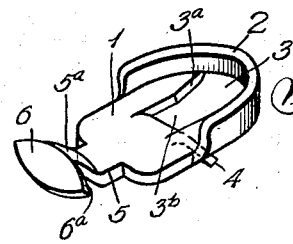
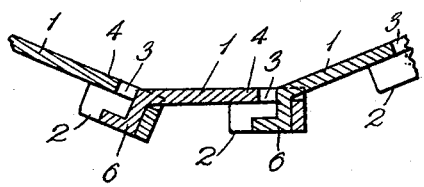
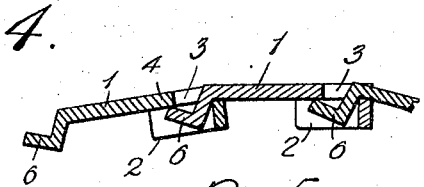
Inventor
O. M. Peters
By Robert Wilson
Attorney Patented Jan. 1, 1929.

1,697,821

UNITED STATES PATENT OFFICE.

OSCAR M. PETERS, OF WAYNESBORO, PENNSYLVANIA, ASSIGNOR TO PROTEX CHAIN COMPANY, INC., OF WAYNESBORO, PENNSYLVANIA, A CORPORATION OF PENNSYLVANIA.

NONSKID CHAIN.

Application filed October 22, 1925. Serial No. 64,251.

This invention relates to a non-skid cross-chain for motor vehicle wheels, composed of an assembly of similar interlocking links, each link having a ground-engaging flange and having a relatively flat body portion which bears against the tire. The links are not intended to roll and turn about their longitudinal axes as do the ordinary cross-chain links, but to remain with their backs against the tire, affording broad bearing surfaces on the tire. This requires a strong swiveled connection between the links to permit of a certain amount of lateral flexure of the chain without permitting the individual links to turn about their longitudinal axes, and, of course, this connection must permit of flexure of the chain in a plane at right angles to the body portions of the links, to permit the chain to wrap around the tire, and it is important also to provide for a certain amount of flexure of the chain in the opposite direction to avoid breakage when the ground-engaging part of the chain is pressed upwardly by abrupt obstacles on the roadway.

In carrying out the invention, I provide a chain of the character described composed of similar links, each comprising a relatively flat body portion, having a strong arcuate ground-engaging flange at one end, and a relatively wide shank projecting from the opposite end, this shank having a head off-set from the body of the link, and the head having its inner edge curved to conform to the curvature of the inner face of the flange of an adjacent link. Each link is also formed with an opening in its body portion extending through the flange and forward from the flange toward the shank. This opening is formed partly by punching out a part of the metal adjacent the flange, and partly by striking up a tongue from the body portion, this tongue in the finished link projecting on the opposite side of the link from that on which the flange is located. The links are assembled by turning the links of a pair so that they lie in planes at right angles to one another, when the head on the one link may be passed through the opening in the other link. The links are then turned so that their bodies lie in the same plane and the tongue on the one link, when flattened, underlies the head on the adjacent link and partly closes the opening so that the head cannot be withdrawn. By striking the tongue out on the side opposite the flange, larger heads can be used on the links than if the tongues were struck up in the opposite direction, because, in the latter case, the tongues could not be flattened without interference with the heads, except by reducing the size of the latter. The openings are sufficiently wider than the shanks, adjacent the flanges, to permit of a limited lateral movement between the links, and the heads are offset from the body portions of the links a sufficient distance to permit of a limited inward flexure of the chain when the ground-engaging portions are passing over abrupt obstacles. By the construction described, the connections between the links are made very strong and with large wearing surfaces, so that the natural life of the chain is increased and danger from breakage is reduced to a minimum.

In the accompanying drawing,

Fig. 1 is a bottom plan view of the chain;

Fig. 2 is a central longitudinal section through the same;

Fig. 3 is a perspective view of one of the links;

Fig. 4 is a central section through several of the links, showing them in angular relation as they fit around the tire; and, Fig. 5 is a similar view illustrating the inward flexure of the links as when the tire is passing over obstacles.

In Figs. 1, 2, and 3 of the drawing, the end links of the chains are indicated at $a$ and $b$, respectively, and the intermediate links at $c$. These intermediate links are alike, each one comprising a relatively flat body portion 1, having one end rounded and turned outwardly at right angles to the body portion, forming an arcuate flange 2. This flange as shown in the drawing is substantially semi-circular in length. The base or body portion has a part cut out adjacent the central part of the flange, forming an opening 3, which extends through the flange, and the side walls $3^a$ of this opening converge forwardly from the flange, as shown. A tongue 4 is struck up from the body of the flange in the manufacture of the link, and this extends the opening, as shown at 3^b. A shank 5 projects centrally from the body portion at the end opposite the flange, and upon the end of this shank is a head 6 which projects laterally at both sides of the shank and which is offset from the body portion by a part 5^a of the shank. The head 6 on its inner edge 6^a is curved to correspond with the curvature of the inner face of the flange 2. The general shape of the head shown in the drawing is elliptical, but the form of the head, except as to the curvature of its inner edge, is not important. The link a, for connecting the cross chain to one of the side chains, is merely a hook, with a shank and head corresponding in shape and size to the shanks and heads of the intermediate links, and the link b, for connecting the cross chain to the other side chain is a hook having a body portion, flange, tongue and opening in all respects the same as the corresponding parts of the intermediate links.

In assembling the links, the links are turned into positions at right angles to one another and the head of one link is inserted through the opening in the other, and the links are then turned so that their bodies lie in the same plane. The head on the one link will then project laterally beyond the edges of the opening in the other link. The tongue 4 is then pressed back into the plane of the body, thus closing the part 3^b of the opening, and the head of one link then becomes interlocked with the other link. As shown, when the links are interlocked, the tongue 4 on one link overlaps the head on the other link. The parts 5^a of the shanks of the links are relatively long, and when the chain is straightened, as shown in Figs. 1 and 2, the head of one link is spaced a short distance from the body portion of the adjacent link. This permits of a certain amount of upward flexure of the links when passing over obstacles. This is illustrated in Fig. 5, which shows two links at an angle to one another with the head of one link touching the body portion of the other link. While the permissible upward flexure between each pair of links is relatively small, the upward flexure of the chain as a whole is sufficient to relieve it of breaking strains when the wheel is passing over abrupt obstacles. When the chain is on a tire, the position of the head of one link with respect to the arcuate flange of the adjacent link is illustrated in Fig. 4. It will be seen that the arcuate inner edge of the head has a bearing for its full length against the arcuate flange. The side walls 3^a of the opening 3 diverge slightly toward the arcuate flange, the purpose of this being to permit the shank of an adjacent link to have a slight turning movement in the opening. The shanks are made approximately as wide as the narrowest part of the opening. When the chain is in use, the traction causes the links to turn with respect to one another so that it is desirable to permit of a slight relative movement between adjacent links, when their body portions are in the same plane. In any position, the head of one link has a large bearing surface on the flange of the link to which it is connected.

The stresses on the connecting portions of the links, in the practical use of the chain, are very severe. Therefore the shanks and heads are made as large as practicable and the flange on each link is extended beyond the sides of the opening for a sufficient distance to make a strong connection with the body of the link, to prevent the flange from being broken by the stresses put upon it. In the manufacture of the link, the tongues 4 are pressed outwardly from the body at the side opposite the flange, and when the links are connected this tongue extends under the head of the adjacent link, giving a wide bearing surface for the head. If the tongues 4 were pressed out on the opposite side of the body, in manufacturing the links, the heads of the links would have to be smaller because the tongues could not be pressed back into the planes of the bodies without interfering with the heads.

What I claim is:

1. A non-skid cross-chain link comprising a relatively flat body having one end rounded and having an arcuate flange projecting substantially at right angles to the body from said rounded end, a shank projecting centrally from the opposite end of the body, said shank having a laterally projecting head offset from the plane of the body, an opening adjacent the end flange of greater width than the shank and of less width than the head, and a tongue adapted to lock the head of a similar link in said opening.

2. A non-skid cross-chain link comprising a relatively flat body having one end rounded and having an arcuate flange projecting substantially at right angles to the body from said rounded end, a shank projecting centrally from the opposite end of the body, said shank having a laterally projecting head offset from the plane of the body and arcuate in form on its inner edge, an opening extending from the central part of the flange toward the shank, said opening being of greater width than the shank and of less width than the head, and a tongue adapted to partly close said opening to lock the head of a similar link in said opening.

3. A non-skid cross-chain link comprising a relatively flat body having one end rounded and having an arcuate flange projecting substantially at right angles to the body from said rounded end, a shank projecting centrally from the opposite end of the body, said shank having a laterally projecting head offset from the plane of the body and arcuate in form on its inner edge, an opening extending from the central part of the flange toward the shank, said opening being of greater width than the shank and of less width than the head, and the sides of said opening in the body diverging toward the flange and adjacent thereto, and a tongue adapted to partly close said opening to lock the head of a similar link in said opening.

In testimony whereof I hereunto affix my signature.

OSCAR M. PETERS.